(12) United States Patent
Butler

(10) Patent No.: US 6,481,110 B1
(45) Date of Patent: Nov. 19, 2002

(54) PLUMB BOB

(76) Inventor: M. Dale Butler, P.O. Box 594, Weatherford, OK (US) 73096

( * ) Notice: Subject to any disclaimer, the term of this patent is extended or adjusted under 35 U.S.C. 154(b) by 0 days.

(21) Appl. No.: 09/353,488

(22) Filed: Jul. 13, 1999

(51) Int. Cl.$^7$ .............................. G01C 15/10; G01B 3/10
(52) U.S. Cl. ............................. 33/393; 33/719; 33/720; 33/768; 33/770
(58) Field of Search ..................... 33/713, 719, 720, 33/721, 722, 755, 756, 761, 768, 770, 391, 392, 393; 73/290 R

(56) References Cited

U.S. PATENT DOCUMENTS

| | | | | |
|---|---|---|---|---|
| 1,055,244 A | * | 3/1913 | Warner ...................... 73/290 R |
| 2,157,024 A | * | 5/1939 | Smith ........................... 33/719 |
| 2,242,603 A | * | 5/1941 | Weldy .......................... 33/719 |
| RE22,367 E | * | 8/1943 | Wiggins ....................... 33/719 |
| 2,361,064 A | * | 10/1944 | Schlumberger .............. 33/719 |
| 2,547,344 A | * | 4/1951 | Sanders .................... 73/290 R |
| 4,077,076 A | * | 3/1978 | Masters ....................... 33/126 |
| 4,236,314 A | * | 12/1980 | Schmidt et al. ............... 33/715 |
| 4,282,624 A | | 8/1981 | Cobb |
| 4,365,509 A | * | 12/1982 | Cornelis ................... 73/290 R |
| 4,451,986 A | * | 6/1984 | Jones, Jr. ..................... 33/720 |
| 4,624,055 A | | 11/1986 | Foster |
| 4,693,483 A | | 9/1987 | Valls |
| 5,243,860 A | * | 9/1993 | Habart ........................ 33/720 |
| 5,426,860 A | | 6/1995 | Lee et al. |
| 5,533,392 A | * | 7/1996 | Kira ............................. 33/720 |
| 5,700,249 A | | 12/1997 | Jenkins |
| 5,791,187 A | * | 8/1998 | Chang ....................... 73/290 R |
| 5,974,676 A | * | 11/1999 | Beall et al. ................... 33/392 |
| 6,013,059 A | * | 1/2000 | Jacobs ........................ 604/110 |

* cited by examiner

Primary Examiner—Christopher W. Fulton
Assistant Examiner—Yaritza Guadalupe
(74) Attorney, Agent, or Firm—Gary Peterson

(57) ABSTRACT

A plumb bob which may be used in combination with a measuring tape for gauging the vertical height of a liquid, such as oil, stored in a tank. The plumb bob comprises a weight which is cushioned at its lower end by a elastomeric bumper. The bumper, which may be formed from an oil-resistant elastomer, protects the tank base from deformational damage during the gauging process.

12 Claims, 3 Drawing Sheets

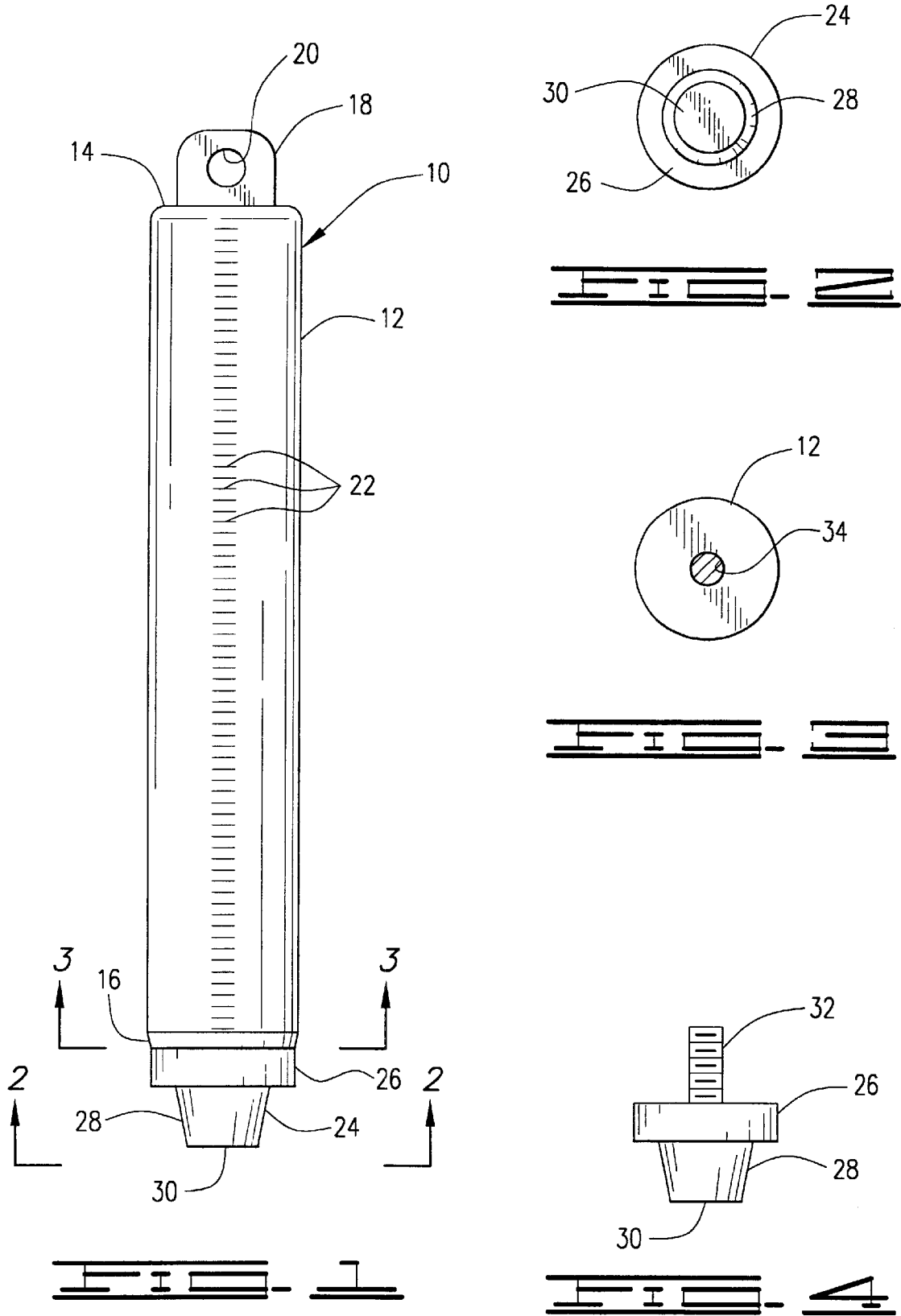

PLUMB BOB

FIELD OF THE INVENTION

The present invention relates generally to a plumb bob, and more particularly to such a bobs usable in a gauging apparatus for measuring the height of a liquid stored in a tank.

SUMMARY OF THE INVENTION

The present invention comprises a plumb bob formed from a weight which is connectable at its upper end to a measuring strip and which is cushioned at its lower end by a resilient bumper. The invention further comprises a gauging apparatus formed from an elongate measuring strip having a lower end to which the plumb bob of the present invention is connected, serving as a load assembly.

The present invention further comprises a storage and gauging system for a liquid. The system comprises a tank having a base section and opposed top section which are joined by an intermediate section, with liquid received in the tank interior. The gauging apparatus of the present invention is lowered into the tank interior through an access port overlying the base section until the resilient bumper of the plumb bob mechanically engages the base section.

BRIEF DESCRIPTION OF THE DRAWINGS

FIG. 1 is a side elevational view of the plumb bob of the present invention.

FIG. 2 is an end view of the plumb bob of the present invention, taken along the line 2—2 shown in FIG. 1.

FIG. 4 is a side elevational view of the bumper of the plumb bob of the present invention, after its removal from the weight 12.

FIG. 6 is a partial side cross-sectional view of the gauging apparatus of FIG. 5 being used to measure the height of a liquid stored in a tank.

DETAILED DESCRIPTION OF THE PREFERRED EMBODIMENT

Figure 5:
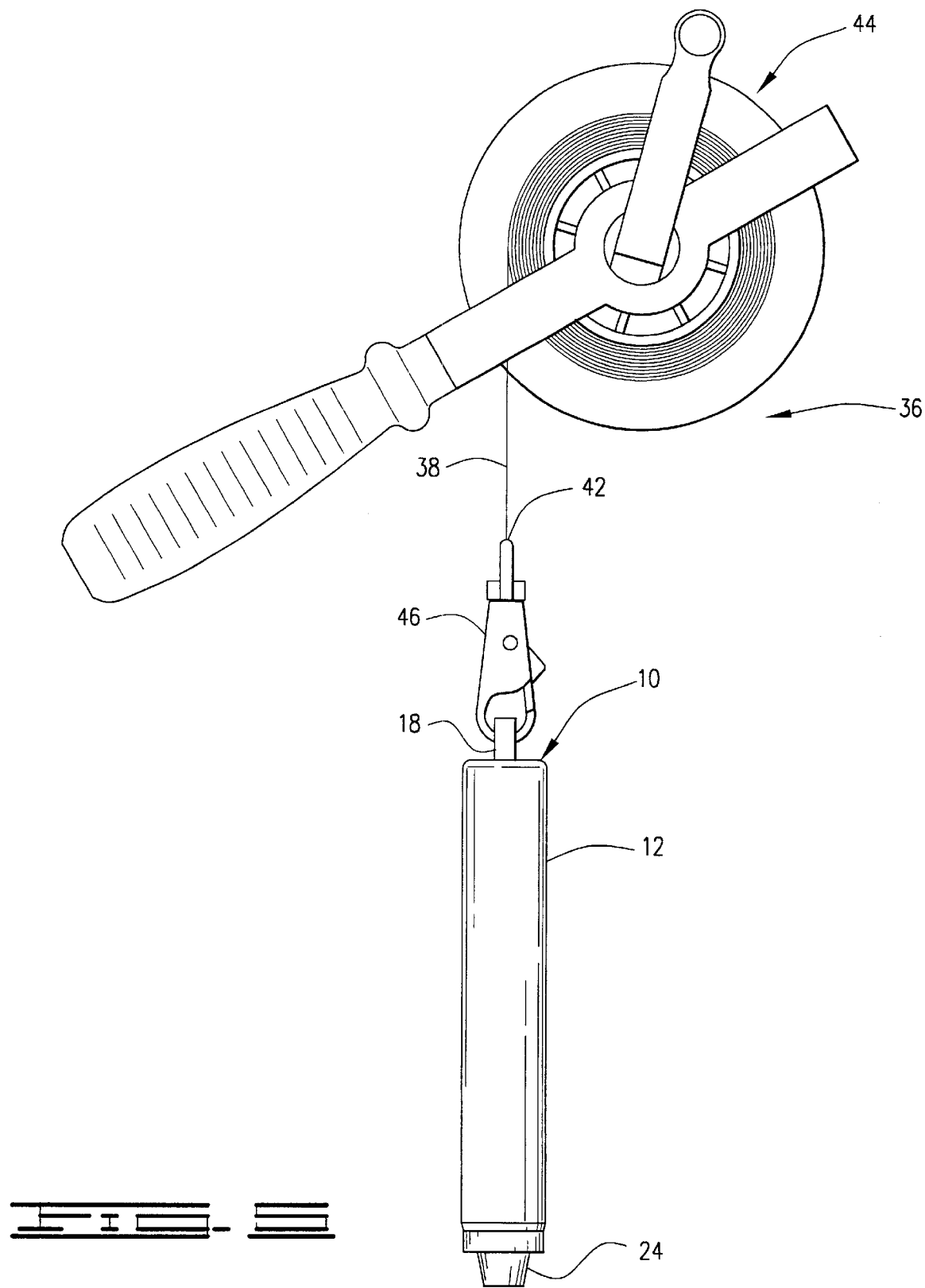
FIG. 5 is a side elevational view showing the plumb bob of the present invention in use in a gauging apparatus, with the plumb bob depending from the lower end of a reeled measuring strip.

With reference to FIG. 1, the plumb bob of the present invention, generally designated by reference number 10, comprises a weight 12, which preferably is formed from a relatively dense and corrosion-resistant material such as brass or copper. The weight 12 preferably is characterized by a weight of between about 1 and about 2 pounds, and more preferably by a weight of about 1 pound, 6 ounces.

The weight 12 is preferably an extended body which is symmetric about a central longitudinal axis. Most preferably, the weight 12 is characterized by a substantially cylindrical configuration, as shown in FIG. 1. In some instances, it may be desirable to provide markings 22, corresponding to units of axial length displacement, graduated along the side of the weight 12.

The weight 12 is further characterized by an upper end 14 and an opposed lower end 16. As will be described in greater detail hereafter, the weight 12 should be connectable with a measuring strip adjacent its upper end 14. The site of connection on the weight 12 most preferably comprises an axially projecting lug 18 formed adjacent the upper end 14 of the weight 12. This lug 18 is penetrated by an eye 20.

With continued reference to FIG. 1, the plumb bob 10 of the present invention further comprises a resilient elastic bumper 24, which is supported by the weight 12 and is positioned to cushion the lower end 16 of the weight 12. The bumper 24 is preferably formed from a thermoplastic elastomer, and most preferably is formed from an oil-resistant elastomer, such as acrylonitrile-butadiene copolymer rubber (NBR).

With reference to FIGS. 1, 2 and 4, the bumper 24 preferably is characterized by a substantially blunt, as opposed to pointed, profile. In the embodiment shown in the Figures, the bumper 24 is characterized by a base 26, which supports a tapered leg 28 having a flattened end 30. This blunt profile assists in distributing the shock produced by impact of the plumb bob 10 on a surface, such as the base of a tank.

Figure 3:
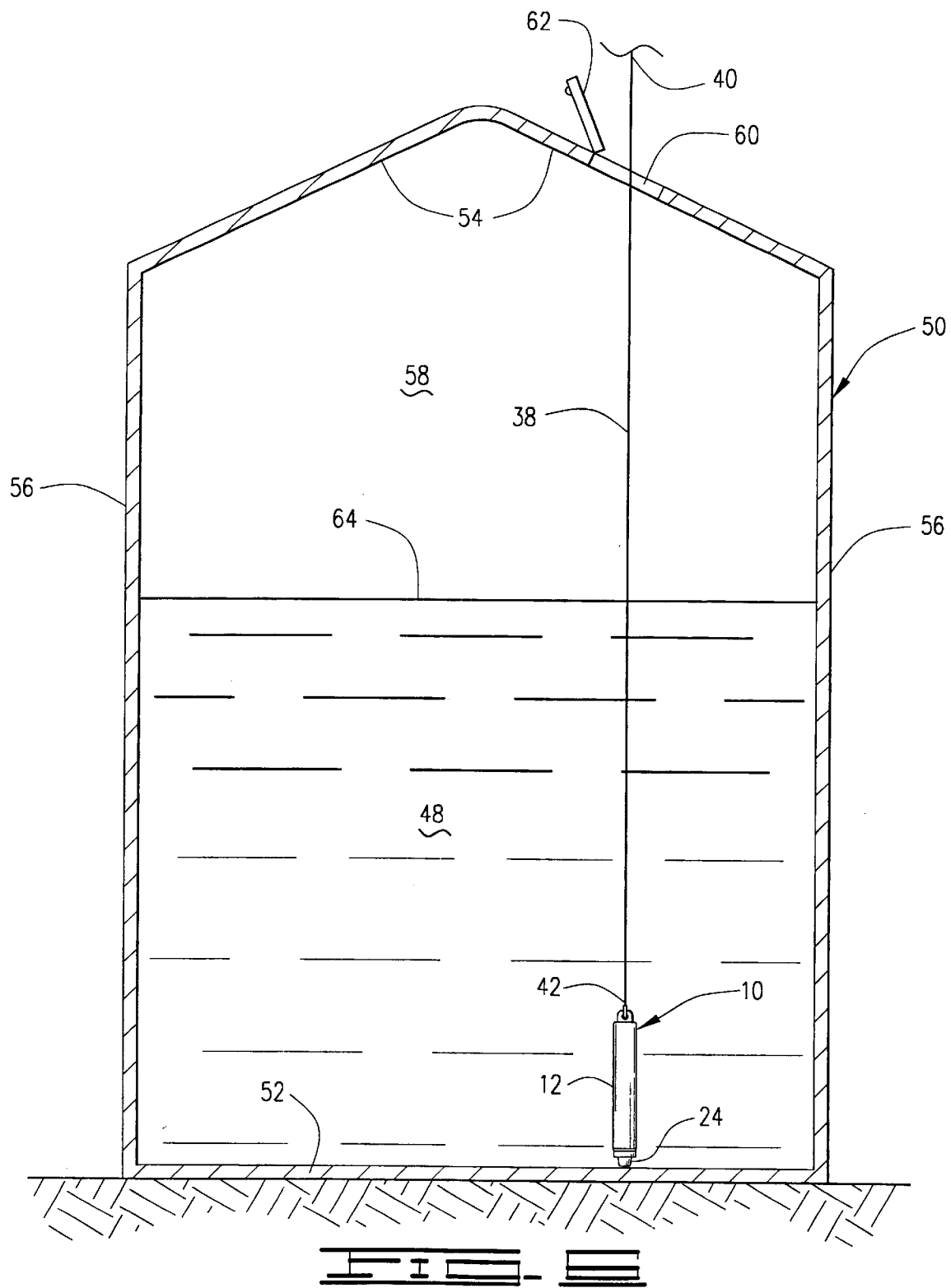
FIG. 3 is a cross-sectional view of the plumb bob of the present invention, taken along the line 3—3 shown in FIG. 1.

As best shown in FIGS. 3 and 4, the bumper 24 is preferably provided with a threaded bolt 32 which extends axially from base 26, on the side opposite the leg 28. An axially disposed and internally threaded channel 34 is formed in the weight 12 at its lower end 16, and is sized to receive the bolt 32. The bumper 24 is secured to the weight 12 by threading bolt 30 into channel 32 until the base 26 engages the lower end 16 of the weight. Preferably, the bolt 32 and channel 34 are configured so that the bolt 32 may be removed from the weight 12 by reversing this step. This removability permits easy replacement of the bumper 24 when conditions warrant.

With reference to FIGS. 5 and 6, the plumb bob 10 of the present invention may be used as a component of a gauging apparatus, generally designated by reference numeral 36. Such a gauging apparatus 36 may be used to measure the height of a liquid in a vessel or container, or to measure other vertical distances. The gauging apparatus 36 comprises an elongate and flexible measuring strip 38, which preferably comprises a flexible tape formed from a strong and corrosion-resistant material such as stainless steel. If the gauging apparatus 36 is to be used to measure the height of a liquid, the measuring strip 38 should be wettable by the liquid to be gauged. For ease of observation of any such wetting liquid, it is preferred that at least a portion of the measuring strip 38 have a background color which visually contrasts with the liquid to be gauged.

As best shown in FIG. 6, the measuring strip 38 is characterized by an upper end, located adjacent reference numeral 40, and a lower end 42. The length of the measuring strip 38 should be selected so as to exceed the maximum height to be gauged. In many applications, a length of between about 25 and about 100 feet will be sufficient. The measuring strip 38 is preferably stored on a dispensing reel, such as the manually operated reel 44 shown in FIG. 5. Measuring strips and reels suitable for use in the practice of the present invention are manufactured in various sizes by the Lufkin Division of Cooper Industries, Inc., Houston, Tex.

With reference to FIG. 5, the measuring strip 38 preferably further comprises a connector 46, such as a snap hook, which functions to connect the lower end 42 of the measuring strip 38 to the upper end 14 of the weight 12. When the connector 46 comprises a snap hook, the connection is formed by passing the hook through the eye 20 formed in the lug 18. Once the plumb bob 10 has been so connected, it functions as a load assembly which depends from the lower end 42 of the measuring strip 38 and maintains the extended measuring strip 38 in a substantially vertical and tensioned state, as shown in FIG. 6. The connection between the plumb bob 10 and measuring strip 38 is preferably selectively releasable, for ease of disassembly of the gauging apparatus 36.

In order to permit convenient measurement of the positioning of any wetting liquid, the measuring strip 38 is preferably at least partially marked, and more preferably completely marked from end to end, with numbered graduations of length. These numbered graduations should be arranged in numerical order, ascending with increasing distance from the lower end 42 of the measuring strip 38.

The numbered graduations should further be arranged so that the number of a particular graduation is equal to the vertical height of that graduation above the base 26, when the measuring strip 38 and plumb bob 10 are in the fully extended position shown in FIG. 6. In order to meet this requirement, the number of a particular graduation should equal the sum of: (1) the distance of that graduation from the lower end 42 of the measuring strip 38; and (2) the combined height of the plumb bob 10 and connector 46.

FIG. 6 shows the use of the gauging apparatus 36 of the present invention to measure the vertical height of a liquid 48 stored in a tank 50. The tank 50 is characterized by a base section 52, which is preferably substantially flat, and an opposed top section 54 defining the upper vertical boundaries of the tank 50. The top section 54 and base section 52 are joined by an intermediate section 56. These sections collectively define a substantially enclosed tank interior 58, within which liquid may received and stored. In many instances, the base section 52 and the intermediate section 56 may comprise the base and walls of a right circular cylinder.

Because the sections forming a tank 50 are generally opaque, direct visual observation of the height of liquid within the tank will ordinarily not be practical. In order to permit measurement of this liquid height, an access port 60 providing access to the tank interior 58 is formed in the top section 54. The access port 60, which should be positioned in overlying relationship to the base section 52, may be opened and closed by means of a hatch 62. The plumb bob 10 and measuring strip 38 should be sized so that they may be received through the access port 60.

In order to measure the height of liquid 48 within the tank interior 58, the plumb bob 10 is connected to the lower end 42 of the measuring strip 38. The plumb bob 10 then is lowered into the tank interior 58 through the access port 60. Functioning as a load assembly, the plumb bob 10 drops under gravity through the tank interior 58 and stored liquid 48, drawing the lower end 42 of the measuring strip 38 into vertical extension within the tank interior 58. The upper end 40 of the measuring strip 38 is maintained outside the tank during this gauging process.

The plumb bob 10 drops through the tank interior 58 until it strikes base section 52. Although the plumb bob 10 may be travelling at a substantial velocity at this point in its descent, the elastomeric bumper 24 serves to minimize any deformational damage to the base section 24 caused by this striking impact. After impact takes place, the measuring strip 38 is withdrawn from the tank interior 58, preferably by reeling it onto dispensing reel 44. As withdrawal progresses, place, the location at which liquid wetting begins on the measuring strip 38 is noted. Withdrawal then continues until the plumb bob 10, as well as the measuring strip 38, have been fully removed from the tank interior 58.

The numerical graduation at the site of first liquid wetting on the measuring strip 38 corresponds to the height above the base section 52 of the liquid level 64 within the tank 50. The gauging apparatus 24 and tank 50 thus cooperate to provide a storage and gauging system for the liquid.

In many instances, a tank will require liquid level gauging measurements on a daily or even more frequent basis, for inventory control purposes or otherwise. When the base section of a tank is subjected to unprotected impacts from a 1 to 2 pound weight with such frequency, structural damage to the portion of base section underlying the access port can eventually result. Such damage can result in loss of valuable liquids stored within the tank, produce adverse environmental impacts, and necessitate costly repairs and/or structural reinforcements to the tank. By cushioning the plumb bob 10 with a lower bumper 24, the present invention minimizes deformational damage to the base section 52 of the tank 50 during the gauging process, thereby reducing the need for costly tank reinforcement and repair.

In some applications, the plumb bob 10 of the present invention is used- to gauge the height of a stored liquid comprising at least one hydrocarbon, such as oil, petroleum, or oil or petroleum products. Use of a bumper 24 formed such an oil-resistant elastomer is highly desirable in such applications, since the elastomeric properties of the bumper 24 will be retained for a longer time period, and swelling of the bumper 24 minimized.

Changes may be made in the construction, operation and arrangement of the various compositions, elements, steps and procedures described herein without departing from the spirit and scope of the invention as defined in the following claims.

What is claimed is:

1. A plumb bob comprising:
    a weight having an upper end and an opposed lower end, the weight connectable with a measuring strip adjacent its upper end; and
    a non-hollow elastomeric bumper which is supported by the weight and which cushions the lower end of the weight.

2. The apparatus of claim 1 in which the bumper is formed from an oil-resistant elastomer.

3. The apparatus of claim 1 in which the bumper is characterized by a substantially blunt profile.

4. A gauging apparatus comprising:
    an elongate measuring strip at least partially marked with numbered graduations of length, and having an upper end and a lower end; and
    a load assembly, comprising:
        a weight having an upper end and an opposed lower end, the upper end of the weight connectable to the lower end of the measuring strip; and
        a non-hollow bumper which is supported by the weight and which cushions the lower end of the weight.

5. The apparatus of claim 4 in which the bumper is formed from an oil-resistant elastomer.

6. The apparatus of claim 4 in which the bumper is characterized by a substantially blunt profile.

7. A storage and gauging system for a liquid, comprising:
    a tank formed from a base section, an opposed top section, and an intermediate section, which sections collectively define a tank interior within which the liquid may stored, the top section having an access port positioned in overlying relationship to the base section and providing access to the tank interior;
    an elongate measuring strip, wettable by the stored liquid, which is at least partially marked with numbered graduations of length, and which is partially and removably extended within the tank interior through the access port, the measuring strip having an upper end positioned outside the tank, and an opposite lower end positioned within the tank interior;

a load assembly receivable through the access port and removably positioned within the tank interior and depending from the lower end of the extended measuring strip, the load assembly comprising:
  a weight having an upper end and an opposed lower end, the upper end of the weight connected to the lower end of the measuring strip; and
  an elastic bumper which is supported by the weight and which cushions the lower end of the weight while mechanically engaging the base section of the tank.

8. The apparatus of claim 7 in which the liquid comprises at least one hydrocarbon, and in which the bumper is formed from an oil-resistant elastomer.

9. The apparatus of claim 8 in which the bumper is characterized by a substantially blunt profile.

10. The apparatus of claim 7 in which the bumper is characterized by a substantially blunt profile.

11. The apparatus of claim 7 in which the liquid comprises at least one hydrocarbon.

12. The apparatus of claim 11 in which the hydrocarbon is selected from the group consisting of oil, petroleum, and oil and petroleum products.

* * * * *